June 7, 1955 — M. E. CHUN — 2,710,388
ECHO RANGING SYSTEM
Filed July 20, 1950

INVENTOR
MELVIN E. CHUN
ATTORNEYS

2,710,388

ECHO RANGING SYSTEM

Melvin E. Chun, Berkeley, Calif., assignor to the United States of America as represented by the Secretary of the Navy Application July 20, 1950, Serial No. 174,950

1 Claim. (Cl. 340—3)

The present invention relates to an underwater sound echo ranging system and more particularly to an underwater sound echo ranging system employing damped oscillation.

Underwater echo ranging systems used in the past have employed a transducer driven by an oscillator producing a constant frequency and amplitude pulsed into a series of discrete spaced pulses passing into the water and moving outwardly from the transducer through the water. The transmission of sound waves through the water produces reverberations of considerable magnitude, and the pulses reflected from a target must be received through the reverberations so that the effective range of the installation may be greatly reduced. Furthermore, the equipment required to produce the driving power for the transducer must include an oscillator and a powerful amplifier which require large amounts of power and are bulky and heavy.

It has been found that the reverberation produced by the water increases exponentially with the pulse length so that long pulses produce greatly increased background noises, but since the range of the equipment is determined by the quantity of energy radiated, shortening the pulse length reduces the range which can be expected. When the echo is reflected from a moving target, the relative movement of the target produces a frequency variation in the reflected signal by the Doppler effect, the indicated response varying in frequency accordingly, so that the operator may experience difficulty in recognizing his own echo. Present systems have therefore used long pulses to secure adequate range and recognized the reflected pulse through the high reverberation where possible.

The present invention employs a transducer resonant at a desired frequency and excited by a low frequency alternating current voltage to produce, when energized, a series of damped waves of short duration rather than a continuous wave which produce less reverberation in the water and which produce a distinctive tone when the reflected pulses are received. Furthermore, the required apparatus is simplified over the previous systems and may be readily installed on small craft. The equipment operates at considerably lower frequencies than conventional pulsed sonar systems, so that the range is increased because of the lower attenuation to low frequencies over high frequencies by sea water.

It is an object of the present invention to provide a sound echo ranging system radiating energy in a series of damped waves.

It is a further object of the present invention to provide a sound echo ranging system having a resonant transducer excited by a low frequency alternating current source.

It is a still further object of the present invention to provide a sound echo ranging system producing an audible signal unaffected by movement of the target.

The exact nature of this invention as well as other objects and advantages thereof will be readily apparent from consideration of the following specification relating to the annexed drawings in which.

As is well-known to those skilled in the art, there are two general types of transducers in general use to-day, the piezo-electric and the magnetostrictive types. The piezo-electric transducer employs a series of piezo-electric crystals and acts electrically in a manner very similar to a capacitor in that it becomes charged to the voltage impressed thereon. The magnetostrictive transducer, on the other hand, includes a series of magnetic coils, and is therefore inductive in action. The transducer may therefore be combined with capacitance or inductance to form a resonant circuit of a frequency determined by the values of inductance and capacitance of the total circuit, which circuit will oscillate at its resonant frequency when the circuit is excited with power from an external source.

In the present invention, the transducer circuit is made resonant at a desired supersonic frequency, such as twenty kilocycles in the well-known echo ranging frequency ranges, and excited from an external source to produce a damped oscillation wave by charging the circuit in series from source of voltage. The transducer circuit is then effectively short-circuited, and oscillates at its resonant frequency until the energy in the circuit is dissipated by the resistance of the circuit.

If the transducer circuit is short-circuited at regular intervals, a series of damped waves will be radiated by the transducer, the number of damped oscillations per second corresponding to the number of times the transducer circuit is short-circuited. The frequency of the damped oscillations will be determined by the resonant frequency of the transducer circuit, and the transmitted energy from the transducer will have a corresponding carrier frequency which is modulated by the frequency at which the circuit is short-circuited. The interval between consecutive short circuits is made to correspond to a frequency in the audible frequency range, in order to produce a readily detectable signal.

Figure 1:
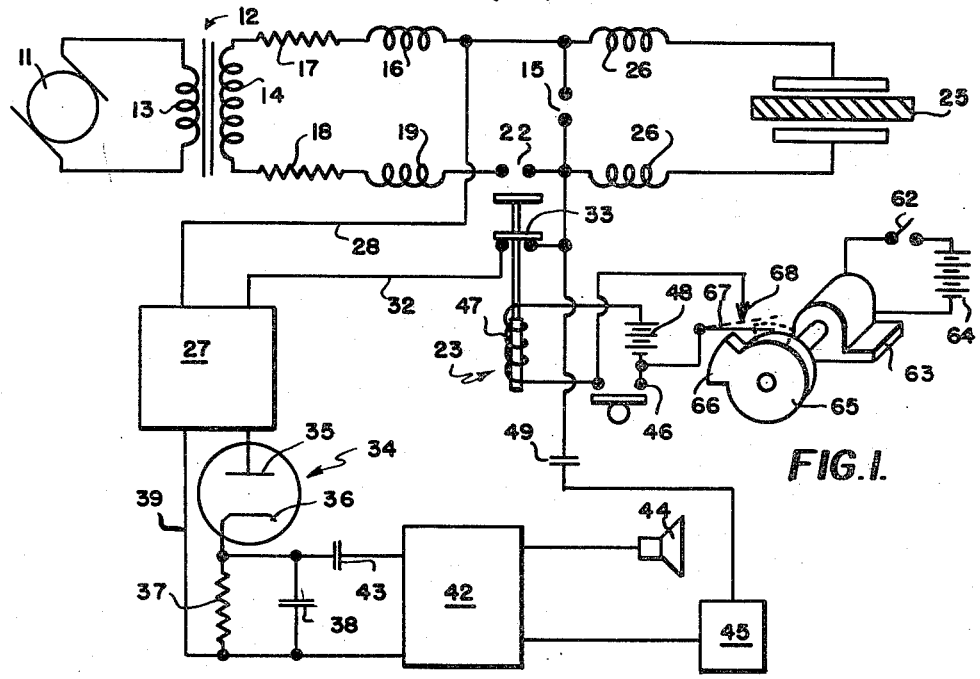
Fig. 1 is a schematic diagram of a preferred modification of the present invention employing a piezo-electric transducer.

Referring now to the drawings, wherein like characters designate like or corresponding parts throughout the several views, there is shown in Fig. 1 a source of alternating current power having a frequency of between 300 and 1000 cycles per second, and illustrated herein by the alternating current generator 11 which may have a frequency of 400 cycles, for example, and driven by any convenient source of power. The voltage produced by the source of alternating current source may be of any convenient value, such as 110 volts.

The transformer 12 is provided with a primary winding 13 connected to said source of alternating current power and a secondary 14 producing a high voltage to excite the transducer circuit hereinafter explained, the voltage being considerably in excess of the breakdown voltage of the spark gap 15 adapted to be connected thereto. For the purposes of illustration, the secondary winding 14 may produce a peak voltage of 5600 volts while the spark gap 15 may have a breakdown voltage of 2500 volts, the spark gap being connected to the secondary 14 by a circuit extending from the upper electrode of the spark gap 15 through the inductance 16 and the current limiting resistor 17 to one terminal of the secondary winding 14 and from the other terminal of the secondary winding through the current limiting resistor 18 and inductance 19 to the normally open contacts 22 of the electromagnetic switch 23, the other side of the contacts 22 being connected to the lower electrode of the spark gap 15.

The transducer 25 is connected across the spark gap 15 by means of the inductances 26. The transducer circuit is made resonant at a predetermined frequency by proportioning the capacitance and inductance of the transducer circuit, and the transducer 25 may be of the piezo-electric crystal type as illustrated in Fig. 1 or the magneto-strictive type illustrated in Fig. 3. In either case, the capacitance of the circuit is charged from the secondary winding 14 up to the voltage at which the spark gap 15 breaks down after which the transducer circuit is short circuited through the arc and oscillates at the predetermined frequency of the transducer circuit, the amplitude of the oscillation declining as the stored energy in the circuit is dissipated.

The duration of the oscillation will be determined by the resistance of the transducer circuit, the initial amplitude of the oscillation by the breakdown voltage of the spark gap 15, and the frequency of oscillation is determined by the capacitance and inductance of the transducer circuit. The repetition rate is equal to twice the frequency of the source of alternating current power since the circuit operates on each half-cycle of the supply voltage.

The present invention will normally be used in echo ranging apparatus in which a pulse of energy is transmitted from the transducer, and the transducer then serves as a hydrophone to receive echos or reflections from objects in the vicinity of the transducer. The length of the pulse energy may vary from about twenty milliseconds to one second, and the repetition rate or pulse interval may be of the order of three to ten seconds. The pulsing rate and pulse lengths just given are conventional, and are familiar to those skilled in the art.

The transducer 25 is employed both as a transmitter and as a receiver, the transducer being normally connected to a tuned amplifier 27 resonant at the predetermined resonant frequency of the transducer circuit by a circuit extending from the upper contact of the spark gap 15 by wire 28 to the tuned amplifier and from the tuned amplifier by the wire 32 to the normally closed contacts 33 of the electromagnetic switch 23, through the contacts 33 to the lower electrode of the spark gap 15. Reflected signals received by the transducer 25 are amplified by the tuned amplifier 27 which also rejects noises having frequencies other than the predetermined frequency radiated by the transducer 25 in transmitting, the output of the amplifier being impressed on an amplitude-modulation detector comprising the diode rectifier 34 having its plate 35 connected to the amplifier 27 and its cathode 36 connected to the amplifier through the resistance 37 paralleled by the condenser 38 and the wire 39. The condenser 38 prevents the voltage appearing across the resistance 37 from changing with sufficient rapidity to reproduce to predetermined resonant frequency so that the voltage across the resistor 37 is proportional to the amplitude of the modulation envelope of the radiated energy.

The voltage appearing across the resistance 37 is impressed on the audio frequency amplifier 42 through the coupling condenser 43 and amplified to a desired amplitude, the output of the audio amplifier 42 being impressed on the loudspeaker 44 and the recorder 45 in well-known fashion.

The recorder 45 is also connected to the transducer 25 by the condenser 49 which impresses a small signal thereon when the transducer is excited from the transformer 12 but is ineffective when the transducer 25 is operated as a receiver because the amplitude of the signal is too small to produce an indication. The recorder 45 therefore receives an impulse when energy is transmitted or received, and the time interval between the recorded indications is a measure of the range of the target from the transducer, since sound travels in sea water at a rate of about 5000 feet per second. Since such distance measurement is well-known to those skilled in the art, further description is unnecessary.

In operation, the transducer 25 is excited to radiate a pulse of energy into the water and then connected to the receiving amplifiers, which transition is effected by the operation of the electromagnetic switch 23. The electromagnetic switch 23 may be operated manually or automatically as desired by the operator, manual operation being effected by operation of the push button 46 which energizes the actuating coil 47 from the battery 48. When the push-button 46 is pressed, the electromagnetic switch 23 is moved to its actuated position closing contacts 22 and opening contacts 33, so that the transducer 45 is connected to the secondary winding 14 of the transformer 12.

Figure 2:
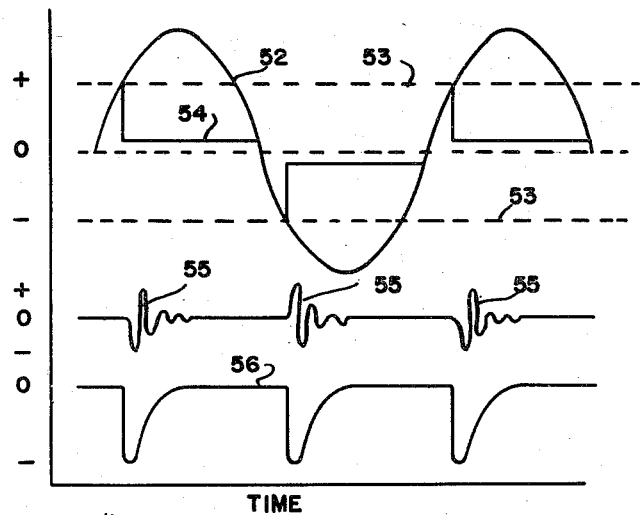
Fig. 2 is a series of curves illustrating the operation of the present invention.

Referring now to Fig. 2, the voltage produced by the transformer 12 is represented by the curve 52 which curve is a sine wave rising to a peak voltage considerably higher than the breakdown voltage of the spark gap 15 represented by the dashed lines 53. The transducer 25 is charged by the voltage represented by the curve 52 until the curve intersects the line 53, at which time the voltage across the spark gap 15 is suddenly reduced as shown by the curve 54. The transducer 25 therefore discharges through the arc across the spark gap 15 and establishes an oscillation indicated by curve 55 which excites the transducer to radiate sound energy persisting until the energy stored in the transducer circuit is dissipated, the procedure being repeated during each half cycle of the voltage of the alternating current source while the electromagnetic switch 23 is actuated. Part of the oscillatory energy in the transducer circuit is impressed on the recorder 45 during transmission through the capacitor 49.

The inductances 16 and 19 prevent the oscillatory voltages produced by the transducer circuit from reaching the transformer 12 and the generator 11 where they would be dissipated as heat, and the current limiting resistors 17 and 18 are included in the circuit to prevent overload on the alternating current source and the transformer 12 during discharge across the spark gap 15.

When the push button 46 is released, the electromagnetic switch 23 returns to its normal position, thus disconnecting the transducer 25 from the transformer 12 and connecting it to the input of the tuned amplifier 27. The reflected sound energy will have a shape similar to that represented by the curve 55 although of greatly reduced magnitude, so that the spark gap 15 has no effect on the operation of the transducer 25. The voltage appearing across the resistor 37 due to the reflected pulses in a series of sharp pulses are indicated by the curve 56, which pulses are amplified by the audio amplifier 42 and applied to the loud speaker 44 and the recorder 45.

If it is desired to automatically energize the transducer 25 at regular intervals, the operator closes the switch 62 which energizes the constant speed motor 63 from the battery 64, the motor revolving the cam 65 having a projection 66 on its periphery adapted to actuate the contact arm 67 adjacent the cam to close contacts 68 connected in parallel with the push-button 46. Each time the projection 66 contacts the contact arm 67, the transducer 25 is energized from the transformer 12 by the circuit previously described for a period of time determined by the speed of rotation of the cam 65 and the arcuate length of the projection 66. The pulsing rate of the installation is determined by the rotational speed of the disc 65.

Figure 3:
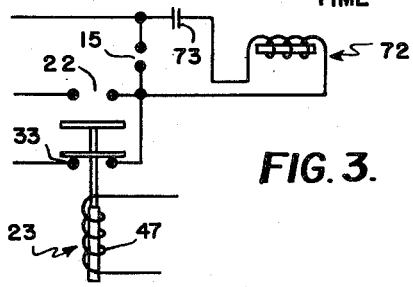
Fig. 3 is a modification of the circuit shown in Fig. 1 employing a magnetostrictive transducer.

Fig. 3 shows a transducer circuit suitable for use with a magneto-strictive transducer, the remaining portions of the circuit being the same as that shown in Fig. 1. The transducer 72 is itself inductive and is connected in series with a capacitor 73 of a capacitance to resonate at a desired frequency with the inductance of the transducer 72, and the series circuit is connected to the electrodes of the spark gap 15. The capacitor 73 charges from the source of alternating current until the spark gap 15 breaks down at which time the transducer circuit commences oscillation as previously described in connection with Fig. 1. The circuit operates in exactly the same manner as that previously described, and will therefore not be described in detail.

It will be obvious to those skilled in the art that many modifications and changes may be made in the device herein described, which illustrates only a preferred modification of the present invention, and that it is intended to cover all modifications of the invention herein chosen for the purposes of the disclosure which do not constitute departures from the spirit and scope of the invention as set forth in the appended claim.

What is claimed is:

In an underwater echo ranging apparatus, a piezoelectric transducer, an inductance connected in series with said transducer to form a series resonant circuit, an arc discharge device having a predetermined breakdown voltage connected in parallel with said series resonant circuit, a tuned amplifier resonant to the same frequency as said series resonant circuit, a detector connected to the output of said tuned amplifier, a sinusoidal alternating current source having a frequency in the audible frequency range and a peak voltage in excess of the predetermined break-down voltage of said arc discharge device, selective switching means for alternately connecting said sinusoidal alternating current source and said tuned amplifier in parallel with said arc discharge device, a recorder receiving a signal from said series resonant circuit when said sinusoidal alternating voltage is connected in parallel with said arc discharge device and a signal from said detector when said tuned amplifier is connected in parallel with said arc discharge device, and sequential timing means for actuating said selective switching means to connect said sinusoidal alternating voltage source in parallel with said arc discharge device to radiate a sustained train of damped waves at twice the frequency of said sinusoidal alternating current source, and to thereafter connect said tuned amplifier to said arc discharge device to receive returned echoes.

References Cited in the file of this patent
UNITED STATES PATENTS

| | | |
|---|---|---|
| 1,858,931 | Langevin et al. | May 17, 1932 |
| 2,201,943 | Dallin | May 21, 1940 |
| 2,400,796 | Watts et al. | May 21, 1946 |
| 2,539,001 | Winchel | Jan. 23, 1951 |